No. 634,657. Patented Oct. 10, 1899.
R. B. YOUNG.
PLUMB LEVEL.
(Application filed Mar. 1, 1899.)
(No Model.)
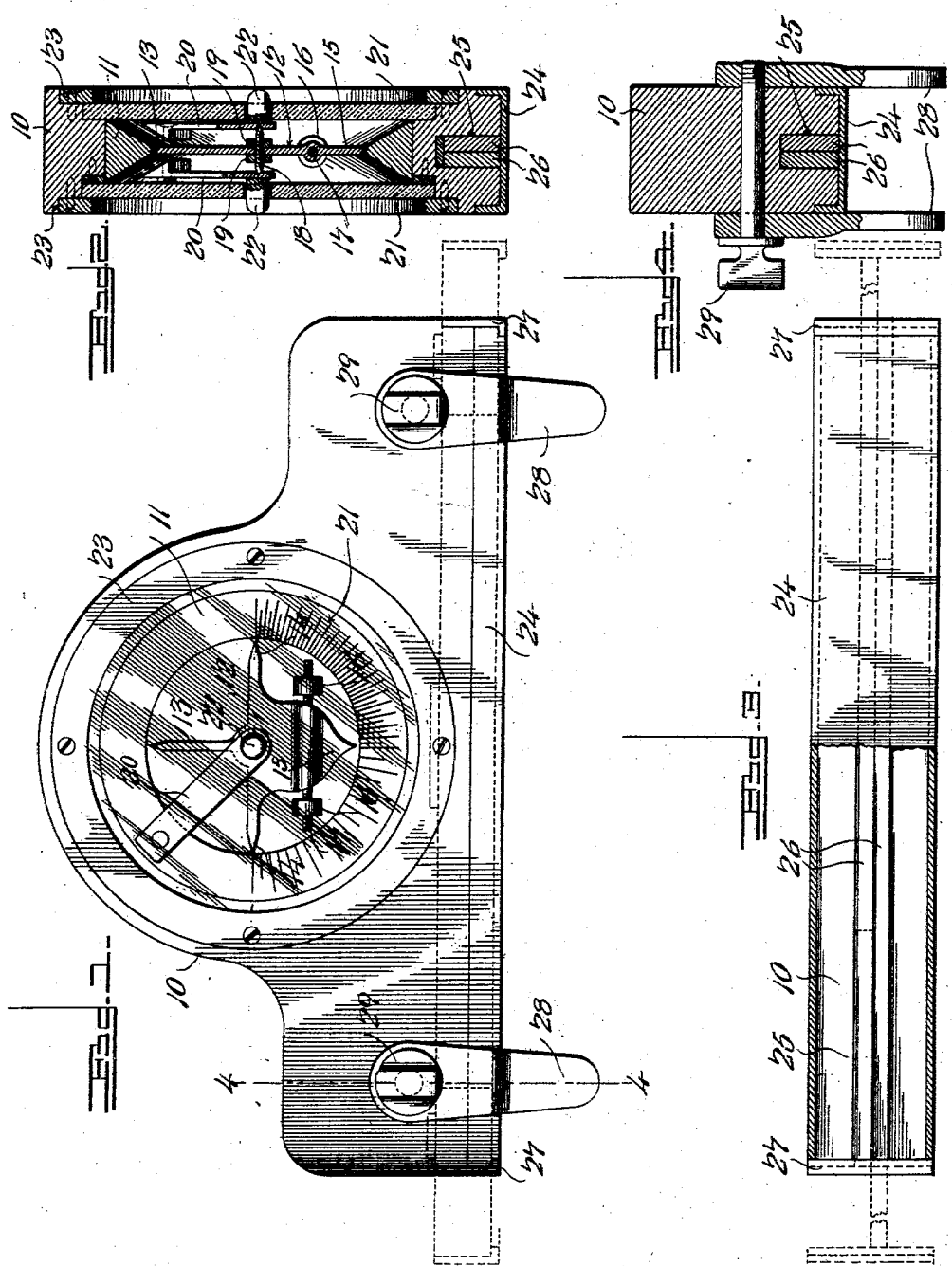
Witnesses
E. K. Stewart
Ransome B. Young Inventor
By his Attorneys.

UNITED STATES PATENT OFFICE.

RANSOME B. YOUNG, OF HAZLETON, PENNSYLVANIA.

PLUMB-LEVEL.

SPECIFICATION forming part of Letters Patent No. 634,657, dated October 10, 1899.

Application filed March 1, 1899. Serial No. 707,299. (No model.)

*To all whom it may concern:*

Be it known that I, RANSOME B. YOUNG, a citizen of the United States, residing at Hazleton, in the county of Luzerne and State of Pennsylvania, have invented a new and useful Clinometer, of which the following is a specification.

My invention relates to a combined clinometer, level, and plumb; and the object in view is to provide a simple, compact, and efficient device adapted to be carried with facility, as in the pocket of a workman, and also provided with simple means whereby an angular measurement may be taken in the dark and maintained until the apparatus can be carried to the light to expose the indicating device.

Further objects and advantages of this invention will appear in the following description, and the novel features thereof will be particularly pointed out in the appended claims.

In the drawings, Figure 1 is a side view of an apparatus constructed in accordance with my invention. Fig. 2 is a transverse section of the same, taken centrally through the indicating device. Fig. 3 is an inverted plan view, partly in section, to show the extension-slides. Fig. 4 is a detail transverse section on the plane indicated by the line 4 4 of Fig. 1.

Similar reference characters indicate corresponding parts in all the figures of the drawings.

10 designates the stock of the instrument, which is cut away at its center to form an opening for the reception of a scale-ring 11, having suitable graduations adapted to be designated by a pendulum-indicator 12, having, preferably, a central upright pointer 13, lateral pointers 14, and a depending pointed weight 15. Carried by this depending weight are adjustable poises 16, mounted upon a transverse threaded pin or rod 17, whereby in case of necessity any inaccuracy of equilibrium in the indicator may be rectified by the adjustment of the poises. The indicator is arranged, as above stated, within the space bounded by the scale-ring, of which the side surfaces are preferably beveled to enable the device to be viewed from either side, and the indicator-spindle 18, which is secured transversely through the indicator by means of suitable nuts 19, is provided with terminal center points mounted in center sockets formed in yielding bracket-arms 20, which may be secured at their outer ends to the frame of the device or, as indicated in the drawings, to the scale-ring. Outside of the planes of the bracket-arms 20, which may be of spring metal or equivalent material, are arranged crystals or other transparent guards 21, the same having central openings through which project grips 22, attached to the bracket-arms adjacent to their free ends and preferably in alinement with the center sockets, in which the extremities of the indicator-spindle are mounted. The outer ends of these grips are exposed beyond the planes of the outer surfaces of the crystals or guards 21, and hence in operating the device, as in the dark, or when it is desired to preserve an indication, the grips may be pressed by the finger and thumb of the operator to clamp the indicator at a given adjustment by forcing the center sockets inward into frictional contact with the center points. The crystals or guards are held in place in the stock to exclude dust from the working parts of the device by means of securing-rings 23.

The device embodying my invention is particularly designed for use by carpenters, mine-workers, and others desiring to obtain the inclination either in angular degrees or any rise or fall at the unit of linear measurement, and the construction of the device is such that it may be used in connection with either the under or the upper side of the object and may also be used to level or to plumb an object, and when the device is used in the dark to obtain the inclination or "run" of the object, or when the same is used in such a position that the operator is enabled to see the graduations of the scale which are designated by the indicator the yielding supports for the spindle of the indicator may by approximating the grips be caused to clamp the spindle, and thus hold the indicator until the operator is enabled to obtain the desired light for reading.

The stock, which is preferably constructed of wood, may be provided with a face-plate 24, and mounted in a channel 25, which is closed at its outer side by said face-plate, are extension-slides 26, having terminal cross-heads 27, which exclude dust from the channel and also perform the function of stops to limit the inward movement of the slides. These slides operate in parallel planes in the channel 25 and either or both may be extended to increase the length of the instrument when applying the same to an object, whereby when used in connection with an object of rough or uneven surface the mean inclination thereof may be obtained by causing the straight edge to extend over a considerable length of the object. When housed, the instrument may be readily carried in the pocket, as in practice I prefer to construct the stock of a length of approximately seven inches, while each of the slides is adapted to be extended a distance of about three and one-half inches to make the maximum length of the device about fourteen inches. Also in practice it may be desirable to apply the stock to a level board, and to provide for such attachment I employ clamps 28, arranged in pairs in contact with opposite sides of the stock and transversely opposite each other, the same being secured in place by means of thumb-screws 29, passing loosely through one member and through the stock and threaded into the other member. These clamp members are arranged to extend at one end beyond the straight edge formed by the face-plate 24, as indicated in Figs. 1 and 4, or to be turned up above said straight edge when not in use.

It will be understood that in practice various changes in the form, proportion, size, and minor details of construction within the scope of the appended claims may be resorted to without departing from the spirit or sacrificing any of the advantages of this invention.

Having described my invention, what I claim is—

1. In an instrument of the class described, the combination of a stock, a scale-ring secured to the stock, a pendulum-indicator arranged in the plane of the scale-ring and having a spindle extended in opposite directions from the plane of the indicator and provided at its extremities with tapering center points, oppositely-disposed inwardly-yielding bracket-arms provided with registering conical center sockets for the reception of the extremities of said spindle, and exposed grips carried by said bracket-arms and adapted to be approximated to swing the bracket-arms inward and clamp the spindle of the indicator at the desired adjustment, substantially as specified.

2. In an instrument of the class described, the combination of a stock having an opening accessible from opposite sides of the stock, a double-beveled scale-ring arranged in said opening, a pendulum-indicator mounted within the space encircled by the scale-ring, transparent guards arranged at opposite sides of the plane of the indicator, inwardly-yielding bracket-arms provided at their free ends with registering bearings for the reception of the extremities of the indicator-spindle, and grips carried by the free ends of the bracket-arms, and extending through central openings in the guards, whereby their outer extremities are exposed for pressure to flex the bracket-arms inwardly and clamp the spindle of the indicator to secure the latter at the desired adjustment, substantially as specified.

3. In an instrument of the class described, the combination of a stock having a central laterally-accessible opening, a scale-ring arranged in said opening, a pendulum-indicator mounted within the space encircled by the scale-ring and provided perpendicular to the vertical plane of its spindle with oppositely-extending threaded pins, poises threaded upon said pins, inwardly-yielding bracket-arms provided with registering bearings for the reception of the extremities of the indicator-spindle, crystals arranged at opposite sides of the plane of the indicator, and outside of said bracket-arms, and grips carried by the free ends of the bracket-arms and extending through central openings in the crystals, with their outer extremities projecting beyond the planes of the outer surfaces of the crystals, substantially as specified.

4. In an instrument of the class described, the combination with the angle-indicating devices of a stock, provided with a longitudinal channel, a face-plate closing the outer side of said channel, parallel slides fitted side by side in the channel and held in place by said face-plate, and cross-heads at the opposite outer extremities of the slides, substantially as specified.

5. In an instrument of the class described, the combination with a stock and indicating devices carried thereby, of spaced pairs of clamp members, the members of each pair being arranged in transversely-opposite positions in contact with the side surfaces of the stock, and set-screws, each of which extends loosely through the stock and one of each pair of clamp members, and is threaded into the opposite clamp member, said clamp members being both adapted to project at their free ends beyond the plane of the straight edge of the stock or to be turned up entirely above said plane, substantially as specified.

In testimony that I claim the foregoing as my own I have hereto affixed my signature in the presence of two witnesses.

RANSOME B. YOUNG.

Witnesses:
JOHN WILHELM,
PETER BUBE.